ically, owing to the fact that the same lye
UNITED STATES PATENT OFFICE.

ARTHUR RAMÉN, OF HELSINGBORG, SWEDEN, ASSIGNOR TO HELSINGBORGS KOPPARVERKS AKTIEBOLAG, OF HELSINGBORG, SWEDEN.

METHOD OF PRECIPITATING METALS ELECTROLYTICALLY.

No. 913,430. Specification of Letters Patent. Patented Feb. 23, 1909.

Application filed August 27, 1906. Serial No. 332,249.

*To all whom it may concern:*

Be it known that I, ARTHUR RAMÉN, a subject of the King of Sweden, and resident of Helsingborg, in the Kingdom of Sweden, have invented certain new and useful Improvements in the Methods of Precipitating Metals Electrolytically, of which the following is a specification.

The hitherto known method of precipitating metals from solutions of metal salts, all have the disadvantage of a very great expenditure of energy being necessary for the precipitation of the metals, due to the difficulty of maintaining a low difference of potential of the anode and the cathode.

In order to make it possible to reduce the expenditure of energy, the difference of potential, which has hitherto by practical reasons been very high, must be maintained at a low rate, and this is attained by reducing the polarization. For this purpose one has, hitherto, tried to attain this purpose by introducing into the anode chambers depolarizing liquids, generally consisting of lyes or solutions, which come from the cathode chambers where they have been deoxidized. In the anode chambers these liquids have a depolarizing action thereby that they are themselves oxidized by the action of the current. However, it has not been possible, according to the said methods, to constantly maintain the difference of potential at a low rate, due to the impossibility of keeping the said depolarizing liquids at a constant composition.

This invention relates to a method, by means of which the expenditure of energy in electrolytical precipitation of metals from solutions of the corresponding salts is reduced in a very essential degree. The said method consists in using as a depolarizing agent in the anode chambers a lye obtained in the manner, that a part is separated from the solution, from which the metals are to be precipitated, and from this part the more negative metals are precipitated by means of iron in the usual manner. The lye resulting from the said precipitation of the more negative metals substantially consists of a solution of ferrous salts, and, having been introduced in the anode chambers, acts as a depolarizing medium thereby that the said lye is oxidized when acted upon by the current. The rest of the original solution of metal salts is introduced into the cathode chamber, in which it is subjected to an electrolyzing process, during which the negative metals are first precipitated and then, after the terminal voltage has been increased, the positive ones. The present method may, for instance, be used in the electrolytical precipitation of copper and other metals from the solution obtained at the lixiviation of ores roasted according to the method of chlorination-roasting. The lye obtained at the said lixiviation and from which the metals are to be won is electrolyzed in the cathode-chambers. As a depolarizing medium in the anode chambers is used the lye, which results after the precipitation by means of iron of the copper and other negative metals from one part of the solution obtained at the said lixiviation process or from a solution of an analogous composition.

Owing to the fact that the lyes, used as depolarizing mediums, according to my invention are produced outside the electrolytical bath, which hitherto has not been the case, they may be concentrated to any desired degree and have any desired composition, and in this way a practical solution is provided of the problem of continuously maintaining the difference of potential of the electrodes at a low rate and thereby reducing the expenditure of energy in electrolytical precipitation of metals from the solutions of the same.

In methods hitherto used the solutions or lyes, from which the copper, silver, zinc and many other metals are precipitated electrolytically, owing to the fact that the same lye was used both as cathode liquid and as anode liquid and in most cases also as lixiviating medium, were so mixed with other metals, as iron, arsenic etc., that pure metals could not be precipitated from the same and that more positive metals, as zinc, nickel etc. after the more negative metals had been precipitated, could not be utilized for the reason that the purifying of the lyes involved too great expenses. In using my method on the other hand, the lyes, from which the metals are to be precipitated electrolytically, are not made impure at all, and, consequently, nearly chemically pure copper, silver, or other metals can be precipitated from the same and, after the more negative metals previously have been precipitated, the more positive metals as zinc, nickel, cobalt etc., may, after the terminal voltage has been increased, be precipitated, without any particular and expensive purifying of the lyes being necessary.

In the producing of the depolarizing liquid the precipitation of the copper or other metal must, evidently, not necessarily be effected by means of iron in a part of the original solution, but as depolarizing liquid any waste lye may be used, which results after the precipitating of copper or other metals from a solution which has a composition analogous to that of the solution from which the metals are to be precipitated electrolytically.

Having now described my invention, what I claim as new and desire to secure by Letters Patent is:

1. In the electrolytic recovery of metals, the process which comprises electrolyzing a solution containing readily electrolyzable metals while maintaining a solution of ferrous salts, substantially free of such metals, about the anode of the electrolytic cell.

2. In the recovery of metals, the process which comprises reducing a solution containing reducible metals by means of metallic iron, electrolyzing a solution containing readily electrolyzable metals and maintaining a body of such reduced solution about the anode during such electrolysis.

3. In the recovery of metals, the process which comprises treating one portion of a solution with metallic iron to reduce readily reducible metals therefrom, electrolyzing another portion of the same solution and during electrolysis maintaining a body of the first reduced portion about the anode.

4. In the recovery of metals, the process which comprises leaching calcined ores, electrolyzing the leachings obtained and during the electrolysis maintaining a solution of ferrous salts in proximity to the anode.

5. In the recovery of metals, the process which comprises leaching calcined ores, reducing a portion of the leachings with metallic iron, electrolyzing the remainder of the leachings and during electrolysis maintaining a body of the reduced portion in proximity to the anode.

6. In the recovery of metals, the process which comprises leaching calcined ores, reducing a portion of the leachings with metallic iron and concentrating the reduced liquid, electrolyzing the remainder of the leachings, and during electrolysis maintaining a body of the concentrated reduced portion in proximity to the anode.

7. In the recovery of metals, the process which comprises leaching a calcined copper ore, treating a portion of the leachings with metallic iron to precipitate the copper therefrom, and electrolyzing the residue of the leachings and during electrolysis maintaining the treated portion in proximity to the anode.

In testimony whereof, I have signed my name to this specification in the presence of two subscribing witnesses.

ARTHUR RAMÉN.

Witnesses:
AXEL NELSON,
N. E. HILLER.